US008672483B2

(12) United States Patent
Su et al.

(10) Patent No.: US 8,672,483 B2
(45) Date of Patent: Mar. 18, 2014

(54) METHOD FOR ADJUSTING COLOR

(75) Inventors: Chen-Kang Su, New Taipei (TW);
Hsin-Yu Chen, New Taipei (TW)

(73) Assignee: Acer Incorporated, New Taipei (TW)

(*) Notice: Subject to any disclaimer, the term of this patent is extended or adjusted under 35 U.S.C. 154(b) by 226 days.

(21) Appl. No.: 13/244,650

(22) Filed: Sep. 25, 2011

(65) Prior Publication Data
US 2012/0249967 A1 Oct. 4, 2012

(30) Foreign Application Priority Data
Mar. 29, 2011 (TW) .............................. 100110774 A

(51) Int. Cl.
*G02B 27/22* (2006.01)
*G03B 21/14* (2006.01)

(52) U.S. Cl.
USPC ................... 353/7; 353/84; 353/121; 352/41; 352/63; 348/743; 359/464

(58) Field of Classification Search
USPC ............ 353/7, 8, 84, 121; 352/38, 41, 42, 57, 352/62, 63; 359/462, 464; 348/742, 743
See application file for complete search history.

(56) References Cited

U.S. PATENT DOCUMENTS

| 5,580,172 A * | 12/1996 | Bhardwaj et al. ............. 374/137 |
| 5,680,180 A * | 10/1997 | Huang ........................... 348/656 |
| 6,453,067 B1 * | 9/2002 | Morgan et al. ................. 382/162 |
| 7,613,335 B2 * | 11/2009 | McLennan et al. ........... 382/128 |
| 7,889,214 B2 * | 2/2011 | Doser ............................ 345/690 |
| 8,066,377 B1 | 11/2011 | Husak et al. |
| 2002/0149546 A1 * | 10/2002 | Ben-Chorin et al. ........... 345/32 |
| 2003/0112507 A1 * | 6/2003 | Divelbiss et al. .............. 359/464 |
| 2007/0279534 A1 * | 12/2007 | Doser ............................ 348/743 |
| 2008/0198179 A1 * | 8/2008 | Doser ............................ 345/690 |
| 2008/0211971 A1 | 9/2008 | Pradhan |
| 2009/0135197 A1 * | 5/2009 | Roth et al. ..................... 345/590 |
| 2010/0134515 A1 * | 6/2010 | Roth et al. ..................... 345/590 |
| 2012/0098439 A1 * | 4/2012 | Recker et al. .................. 315/152 |
| 2012/0128246 A1 * | 5/2012 | Yang et al. ..................... 382/167 |
| 2012/0147163 A1 * | 6/2012 | Kaminsky ....................... 348/62 |
| 2012/0249967 A1 * | 10/2012 | Su et al. ............................ 353/7 |
| 2012/0307388 A1 * | 12/2012 | Bornhorst ...................... 359/888 |

FOREIGN PATENT DOCUMENTS

| EP | 0742675 | 11/1996 |
| WO | 0232149 | 4/2002 |

OTHER PUBLICATIONS

"Search Report of Europe Counterpart Application", issued on Aug. 1, 2012, p. 1-p. 6, in which the listed references were cited.

* cited by examiner

*Primary Examiner* — John Lee
(74) *Attorney, Agent, or Firm* — Jianq Chyun IP Office

(57) ABSTRACT

A method for adjusting color, suitable for a three dimension (3D) projector, is provided. In the present invention, a plurality of segment ranges of a color wheel is covered one by one, and it is measured a color temperature corresponding to the color wheel after each of the segment ranges is covered. Then, each of the color temperatures is compared with a standard color temperature for choosing one of the color temperatures closest to the standard color temperature. And the segment range corresponding to the color temperatures closest to the standard color temperature is regarded as a correctional covering segment.

8 Claims, 2 Drawing Sheets

METHOD FOR ADJUSTING COLOR

CROSS-REFERENCE TO RELATED APPLICATION

This application claims the priority benefit of Taiwan application serial no. 100110774, filed on Mar. 29, 2011. The entirety of the above-mentioned patent application is hereby incorporated by reference herein and made a part of this specification.

BACKGROUND

1. Field of the Invention

The invention relates to a method for adjusting color of a projector. Particularly, the invention relates to a method for adjusting color according to a segment characteristic of a color wheel of a projector.

2. Description of Related Art

With development of technology, to meet the demand for more realistic images, the display technique has been developed from a two-dimensional (2D) display technique to a three-dimensional (3D) display technique, which provides a 3D visual enjoyment besides general images and colors. A 3D image is formed by user's brain through a parallax of left and right eyes of the user, so that the image perceived by the use's brain has a distance difference and a 3D effect. Commonly used 3D projection techniques include an active 3D projection technique and a passive 3D projection technique. The active 3D projection technique uses a page-flipping display mode in collaboration with a shutter 3D glasses to swiftly switching a left lens and a right lens in alternation, so that the left eye only views a left image and the right eye only views a right image, so as to achieve the 3D effect through the parallax of the two eyes.

A digital light processing (DLP) technique is a digital projection and display technique, by which a digital video is received to produce a series of digital light pulses. After these light pulses enter the user's eyes, the user's eyes can interpret these light pulses into color analog images. The display technique of a DLP projector is mainly based on a color sequential method, by which a white light bulb (a high pressure mercury lamp) is used in collaboration with a color wheel to filter different colors, and then a digital micromirror device (DMD) is used to reflect the color complied with the image to a screen for imaging. A main color separation technique is to use the bulb light source to generate an energy waveform to concentrate energy to different segments of the color wheel, so as to form different colors.

A material of the shutter 3D glasses is mainly liquid crystal, and the lenses thereof are two small windows capable of being opened and closed under control. When the same projector alternately plays the left eye and right eye images, based on the synchronous switching function of the liquid crystal glasses, when the left eye image is played, the left lens is opened and the right lens is closed, so that the left eye views the left image, and the right eye views nothing. Comparatively, when the right eye image is played, the right lens is opened and the left lens is closed, so that the right eye views the right image, and the left eye views nothing. In this way, the left eye and the right eye can respectively view the left eye image and the right eye image to form the parallax so as to achieve the 3D effect.

As people seek more realistic and more natural image quality, the 3D projection technique draws more and more attentions. Therefore, how to improve the quality of the image output by the 3D projector becomes an important issue to be developed.

SUMMARY OF THE INVENTION

The invention is directed to a method for adjusting color, which is adapted to mitigate a problem of color deviation a three-dimensional (3D) projector.

The invention provides a method for adjusting color, adapted to a three-dimension (3D) projector. In the present invention, a plurality of segment ranges of a color wheel is covered one by one, and it is measured a plurality of color temperatures corresponding to the color wheel after each of the segment ranges is covered. Then, each of the color temperatures is compared with a standard color temperature for choosing one of the color temperatures closest to the standard color temperature. The segment range corresponding to the color temperature closest to the standard color temperature is regarded as a correctional covering segment.

In an embodiment of the invention, the 3D projector is used in collaboration with a pair of 3D glasses, and the segment range is calculated according to a rotation frequency of the color wheel and a switching time for alternately switching lenses of the 3D glasses.

In an embodiment of the invention, the standard color temperature is a sunlight color temperature.

In an embodiment of the invention, the method for adjusting color further includes adjusting energy waveforms of uncovered segments in the color wheel according to an energy waveform of the correctional covering segment. For example, the energy waveform of the correctional covering segment is removed, and the energy waveform of the correctional covering segment is added to the uncovered segments in the color wheel.

In an embodiment of the invention, in the method for adjusting color, after an image is received, it is determined whether the image is a 3D image. When the image is the 3D image, the energy waveforms of the uncovered segments in the color wheel are adjusted according to the energy waveform of the correctional covering segment. Moreover, when the image is not the 3D image, all segments of the color wheel are used to display the image.

In an embodiment of the invention, the color wheel includes a red segment, a yellow segment, a green segment, a cyan segment, a white segment and a blue segment.

According to the above descriptions, in the invention, a partial covering method is used to find the most suitable correctional covering segment, and the color temperature of the color wheel is close to the standard color temperature, so as to mitigate the problem of color deviation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
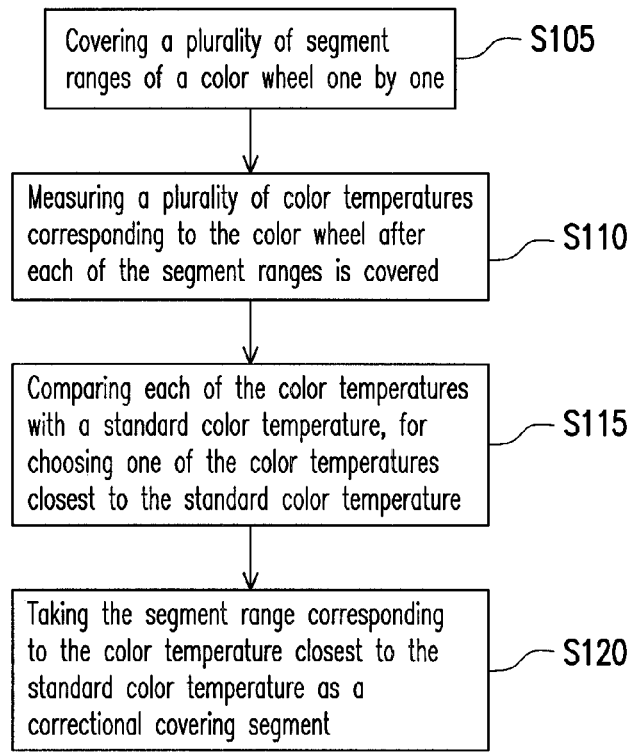
FIG. 1 is a flowchart illustrating a method for adjusting color according to an embodiment of the invention.

FIG. 1 is a flowchart illustrating a method for adjusting color according to an embodiment of the invention. Referring to FIG. 1, first, in step S105, a plurality of segment ranges of a color wheel is covered one by one. In the present embodiment, a digital light processing (DLP) projector and a pair of shutter 3D glasses is taken as an example for description, though the invention is not limited thereto.

Since alternate switching of lenses of the 3D glasses requires a period of switching time, the color wheel is required to have a period of covering time (the switching time for alternately switching the left and right lenses) to avoid a cross-talk phenomenon of left and right images (for example, image sticking). Therefore, the covered segment range can be calculated according to a rotation frequency of the color wheel and the switching time for alternately switching the lenses of the 3D glasses. For example, it is assumed that the rotation frequency of the color wheel is 120 Hz, and the switching time of the 3D glasses is 2 milliseconds (ms). The switching time 2 ms for alternately switching the lenses of the 3D glasses is equivalent to rotate the color wheel for 87° (the segment range), i.e. 0.002*120*360. Moreover, a synchronization signal is used to switch the left and right lenses (notifying a timing for switching the glasses), and in the 87° covered segment range, the 3D projector can provide the synchronization signal to the 3D glasses.

Then, in step S110, it is measured a color temperature corresponding to the color wheel after each of the segment ranges is covered. Namely, after one of the segment ranges of the color wheel is covered, the color temperature of a light source passing through the color wheel is measured.

For example, a start position is set in the color wheel, and the start position serves as a covering position to cover a segment range, and then the color temperature is measured after the segment range is covered. Then, the covering position is shifted by a distance to cover a segment range to measure the color temperature. For example, the start position is 0°, and the segment range from 0° to 87° is covered to measure the color temperature. Then, the covering position is shifted for 5° clockwise, and the segment range from 5° to 92° is covered to measure the color temperature. Then, the covering position is again shifted for 5° clockwise, and the segment range from 10° to 97° is covered to measure the color temperature, and deduced by analogy until the covering position is shifted for 360° (i.e. shifted back to the start position 0°). In this way, the color temperatures measured when different segment ranges are covered are obtained.

After a plurality of the color temperatures is obtained, in step S115, each of the color temperatures is compared with a standard color temperature for choosing one of the color temperatures closest to the standard color temperature. A level of the color temperatures represents a variation of luminance (i.e. black and white) in the whole gray level, and the lower the color temperature is, the warmer and the more yellow and red the image color trends to be. Comparatively, the higher the color temperature is, the cooler and the more cyan and blue the image color trends to be. Therefore, to close the color to the sunlight, the standard color temperature is set as a sunlight color temperature, which is 6500 K (Kelvin).

Finally, in step S120, the segment range corresponding to the color temperature closest to the standard color temperature is taken as a correctional covering segment.

Figure 2A:
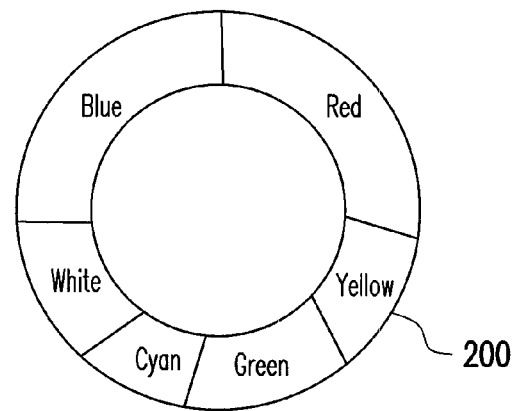
FIG. 2A-FIG. 2C are schematic diagrams illustrating segments of a color wheel according to an embodiment of the invention.
Figure 2B:
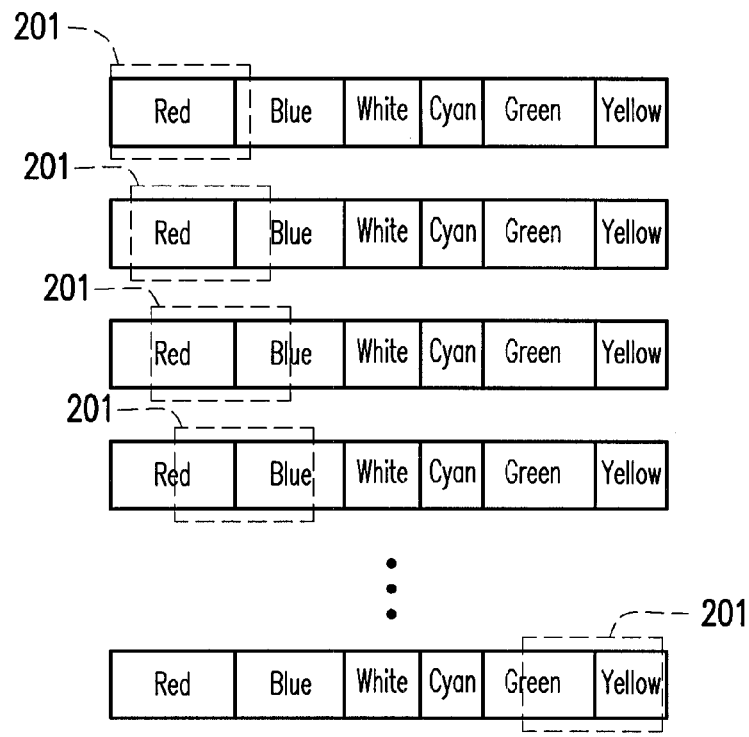
Figure 2C:
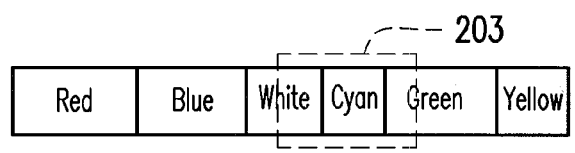

An embodiment is provided below for description. FIG. 2A-FIG. 2C are schematic diagrams illustrating segments of a color wheel according to an embodiment of the invention. In FIG. 2A, the color wheel 200 includes a red segment, a blue segment, a white segment, a cyan segment, a green segment and a yellow segment. Here, for clarity's sake, the color wheel 200 of FIG. 2A is spread as that shown in FIG. 2B. Referring to FIG. 2B, a dot line frame 201 represents the covered segment range. In the beginning, the segment range is covered from the red segment, and then the covering position is shifted rightwards for a distance to cover the segment range until the covering position is shifted to the end of the color segment (i.e. circles the color wheel for a round). Each time when one of the segment ranges is covered, the corresponding color temperature is measured and recorded. Then, one of the color temperatures closest to the standard color temperature is found. A final result is as that shown in FIG. 2C, in which a suitable correctional covering segment 203 is found.

For example, the color wheel of the projector has the RYGCWB color segments, to cover a 87° segment range, a most convenient manner is to cover the cyan segment and the white segment, and now only the RYGB color segments of the color wheel are left, which may cause that the image is yellow-green-biased (a proportion of the yellow color is increased) and the brightness is decreased (as the white segment is covered). According to the above steps S105-S120, the suitable segment range to be covered can be found according to the current color wheel segment, and the color temperature is close to the standard color temperature, which is, for example, 6500 K. In FIG. 2C, the correctional covering segment 203 covers a part of the white segment, all of the cyan segment and a part of the green segment, and since the current color temperature is close to the standard color temperature, the problem of color deviation occurred when the cyan segment and the white segment are covered is mitigated. Moreover, compared to the situation that that only the cyan segment and the white segment are covered, the correctional covering segment 203 is shifted rightwards to cover a part of the green segment, and a part of the white segment is uncovered, so that the problem of brightness reduction is also mitigated.

Moreover, an energy waveform for providing energy to a bulb of the DLP projector can be adjusted and defined, so that the color light may have a corresponding color compensation, and finally the quality of the color light received by a light sensor can be close to the quality of the original color light as far as possible. The energy waveform can strengthen energy of a certain color segment to improve brightness or color performance. For example, when the main energy waveform is in the red segment, the cyan segment and the blue segment, performance of these three colors can be improved. In the present embodiment, an irregular energy waveform is provided with intention to effectively use the energy of the covered segment range, and move the energy to a suitable position to increase the brightness. Namely, energy waveforms of the uncovered segments in the color wheel are adjusted according to the energy waveform of the correctional covering segment.

Figure 3:
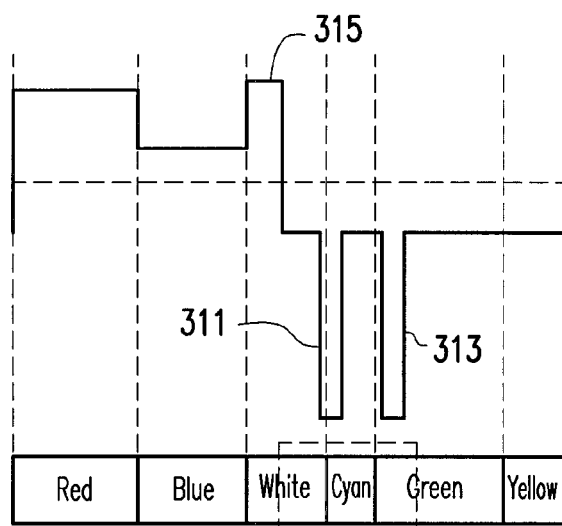
FIG. 3 is schematic diagram of an energy waveform according to an embodiment of the invention.

FIG. 3 is schematic diagram of an energy waveform according to an embodiment of the invention. In the present embodiment, FIG. 2C is taken as an example for description. The energy waveform of the correctional covering segment 203 is removed, and the energy waveform of the correctional covering segment 203 is added to the other uncovered segments in the color wheel, for example, the white segment. Referring to FIG. 3, energy of a pulse 311 and a pulse 313 of the correctional covering segment 203 is added to the pulse 315, so as to improve the output brightness. Moreover, in the other embodiments, the energy waveform of the correctional covering segment 203 can also be added to the red segment, the blue segment or the yellow segment according to different requirements, which is not limited by the invention.

When the 3D projector receives an image, it further determines whether the image is a 3D image. When the image is the 3D image, the suitable correctional covering segment can be found according to the aforementioned method, and the energy waveforms of the uncovered segments in the color wheel are adjusted according to the energy waveform of the correctional covering segment. Moreover, when the image is not the 3D image, all segments of the color wheel are used to display the image.

In summary, during the 3D projection, since the 3D glasses requires a period of the switching time for switching the left and right lenses, to avoid interference generated during the switching time, a segment range of the color wheel is covered. In the above embodiment, a partial covering method is used to find the most suitable correctional covering segment, and the color temperature of the color wheel is close to the standard color temperature, so as to mitigate the problem of color deviation. Moreover, the energy of the correctional covering segment can be effectively used, which can be moved to a suitable position to improve the brightness.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for adjusting color, adapted to a three-dimension (3D) projector, the method for adjusting color comprising:
    covering one of a plurality of segment ranges of a color wheel one by one;
    measuring a plurality of color temperatures respectively corresponding to the color wheel after each of the segment ranges is covered one by one;
    comparing each of the color temperatures with a standard color temperature, for choosing one of the color temperatures closest to the standard color temperature; and
    taking the covered segment range corresponding to the color temperature closest to the standard color temperature as a correctional covering segment.

2. The method for adjusting color as claimed in claim 1, wherein the 3D projector is used in collaboration with a pair of 3D glasses, and the segment range is calculated according to a rotation frequency of the color wheel and a switching time for alternately switching lenses of the 3D glasses.

3. The method for adjusting color as claimed in claim 1, wherein the standard color temperature is a sunlight color temperature.

4. The method for adjusting color as claimed in claim 1, wherein the color wheel has a plurality of segments, and each of the segment ranges crosses at least one of the segments, the method further comprising:
    adjusting energy waveforms of the uncovered segments not belonging to the correctional covering segment in the color wheel according to an energy waveform of the correctional covering segment.

5. The method for adjusting color as claimed in claim 4, wherein the step of adjusting the energy waveforms of the uncovered segments not belonging to the correctional covering segment in the color wheel according to the energy waveform of the correctional covering segment comprises:
    removing the energy waveform corresponding to the correctional covering segment from energy to a bulb provided by the 3D projector, and adding the energy waveform of the correctional covering segment to the energy waveform corresponding to the uncovered segments in the energy to the bulb provided by the 3D projector.

6. The method for adjusting color as claimed in claim 4, further comprising:
    receiving an image;
    determining whether the image is a 3D image; and
    adjusting the energy waveforms of the uncovered segments in the color wheel according to the energy waveform of the correctional covering segment when the image is the 3D image.

7. The method for adjusting color as claimed in claim 6, wherein after the step of determining whether the image is the 3D image, the method further comprises:
    using all segments of the color wheel to display the image when the image is not the 3D image.

8. The method for adjusting color as claimed in claim 1, wherein the color wheel comprises a red segment, a yellow segment, a green segment, a cyan segment, a white segment and a blue segment.

* * * * *